United States Patent [19]

Demyanovich

[11] E Patent Number: Re. 33,531

[45] Reissued Date of Patent: Feb. 5, 1991

[54] LIQUID MIXING EMPLOYING EXPANDING THINNING LIQUID SHEETS

[76] Inventor: Robert J. Demyanovich, 269 Hanover #301, Oakland, Calif. 94606

[21] Appl. No.: 375,189

[22] Filed: Jul. 3, 1989

Related U.S. Patent Documents

Reissue of:

[64] Patent No.: 4,735,359
Issued: Apr. 5, 1988
Appl. No.: 832,853
Filed: Feb. 24, 1986

[51] Int. Cl.[5] ..... B05B 1/26

[52] U.S. Cl. ..... 239/1; 239/433; 239/543

[58] Field of Search ..... 239/527, 543, 422, 423, 239/433, 1, 306; 366/77.176–178

[56] References Cited

U.S. PATENT DOCUMENTS

| | | | |
|---|---|---|---|
| 1,239,230 | 9/1913 | Shaw | 236/545 |
| 2,813,751 | 11/1957 | Barrett | 239/543 |
| 3,840,179 | 10/1974 | Krohn et al. | 239/1 |
| 4,239,732 | 12/1980 | Schneider | 422/133 |
| 4,289,732 | 9/1981 | Bauer et al. | 239/545 |

FOREIGN PATENT DOCUMENTS

| | | |
|---|---|---|
| 298127 | 6/1954 | Switzerland . |
| 203794 | 9/1923 | United Kingdom . |

OTHER PUBLICATIONS

Sackheim, R. L., Lee D. H., "Rocket Propulsion," TRW Electronics and Defense Sector/Quest, Summer 1983, pp. 12–14.

Kletenick, Y. B., "A Mixer for Investigating the Kinetics of Rapid Reactions in Solutions by the Flow Method," Russian Journal of Physical Chem., vol. 37(5), May 1963.

*Primary Examiner*—Michael S. Huppert
*Assistant Examiner*—Kevin Weldon
*Attorney, Agent, or Firm*—David Pressman

[57] ABSTRACT

Two or more liquids are mixed continuously in very short times and in a highly uniform manner. Thin sheets of the liquids to be mixed are formed and contacted to produce a new mixed sheet. The newly formed mixed sheet is highly turbulent which substantially enhances mixing. Since the contacting of the liquids occurs on a scale of microns of thickness, mixing is not only rapid but complete and extremely uniform as well. Turbulence within the mixed sheet that further enhances mixing allows for mixing times as low as 0.1 millisecond, depending on flowrate and pressure drop, for low viscosity fluids.

19 Claims, 3 Drawing Sheets

LIQUID MIXING EMPLOYING EXPANDING THINNING LIQUID SHEETS

Matter enclosed in heavy brackets [ ] appears in the original patent but forms no part of this reissue specification; matter printed in italics indicates the additions made by reissue.

BACKGROUND

1. Field of the Invention

This invention relates to rapid and complete mixing of fluids in a continuous manner by a process that mixes very thin liquid sheets of the different fluids together.

2. Description of Prior Art

The prior art has been concerned for many years with the rapid and complete mixing of liquids so as to reduce segregation of components within the mixture. Less than very rapid and complete dispersion is particularly deleterious in processes utilizing very fast reactions. The term fast reaction implies a reaction that has a time scale that is more rapid or on the same order of the time scale of mixing of the reactants. If the fast reactions are complex, i.e., they involve reactions that are multistep, then product distribution can be adversely affected (see J. Y. Oldshue, Fluid Mixing Technology, McGraw-Hill Publications Co., New York, N.Y., 1983, pp. 222–229). Segregation that occurs due to inhomogeneities within the mixture on the molecular scale can change the product distribution from that calculated assuming perfect and complete mixing before the reactions, begin, Particularly with multiple reactions failure to pay attention to segregation within the mixture can cause wastage of raw materials in producing undesired substances, difficulties in scale-up, and an increased load on the separation plant (see J. R. Bourne, F. Kozicki, and P. Rys, "Mixing and Fast Chemical Reaction", Chem. Eng. Sci., 36(10), pp. 1643–1663, 1981).

In general, liquid phase reactions occuring in viscous media, such as polymerization and biochemical reactions, are particularly subject to the influence of segregation. A recent symposium "Rapid Mixing and Sampling Techniques in Biochemistry" explained the problems of characterizing biochemical reactions that proceeded more rapidly than the time scale of the initial mixing of the reactants (see Chance, B., et. al. (eds.), Rapid Mixing and Sampling Techniques in Biochemistry, Academic Press, New York, N.Y., 1964).

Prior art for rapid mixing generally uses jets of liquid that impinge against one another or tangentially mounted feed tubes that mix the fluids in a swirl cup. An example of such a mixing device is given in U.S. Pat. No. 4,239,732, granted Dec. 16, 1980 to W. Schneider. These types of mixers can give fairly complete mixing of very small amounts of liquids in times as low as milliseconds for low viscosity fluids. However, these streams are relatively thick and this limits the speed with which solutions can be mixed. It has long been known that if two or more liquids can be made as thin as possible before they are mixed, then rapid and complete mixing is virtually assured (see p. 49–53 in Chance, B. et. al., supra).

To this end a Russian scientist, Yu B. Kletenik in the Russian Journal of Physical Chemistry, Vol. 37(5), p. 638 (May, 1963) has devised a mixing device that mixes thin liquid layers together. It does this by flowing two liquids between very narrow parallel plates similar to a triple decker sandwich. Between the first two plates the first fluid flows and between the second and third plate the second fluid flows. The liquids are accelerated to high velocities (two meters/second or higher), so that they flow separately through the parallel plates, and are mixed once they flow beyond the end of the plates and into free space. With this system Kletenick claims to have obtained mixing times on the order of 90 to 100 microseconds for low viscosity liquid sheets of 200 microns thickness.

Although Kletenick claims that his device provides fast mixing, it suffers from a number of drawbacks.

(1) Since the device requires flow between two parallel flat plates with a very narrow gap and of significant length, the pressure drop is relatively high. Any attempt to further decrease the size of the thin film produced further increases the pressure drop. This is particularly severe if the reactants are viscous.

(2) The width of the plates themselves must also be very thin (100 microns), otherwise the fluids will completely miss each other once they flow out the end of the narrow gaps. Such a device is not only difficult to construct but is also very delicate, rendering it unsuitable for industrial use. Applications where the fluids must be injected at only moderately high pressures are not feasible.

(3) The device is limited to a gap of about 0.1 mm between plates which limits the thinness of the sheets formed to 0.2 mm or 200 microns as per Kletenick's analysis of how his mixing device works.

(4) Because of the very narrow plate gaps plugging is a potential problem in systems containing suspended solids.

(5) Kletenick's device is impractical at usual industrial flowrates of liters per minute and higher.

SUMMARY AND OBJECTS OF THE INVENTION

It has now been surprisingly found that the very thin liquid sheets formed from liquid atomizers prior to droplet formation can be contacted or impinged at one another to produce a thin liquid mixed sheet. The result is surprising because such thin sheets (25 microns and less) are generally subject to disruption if they are contacted. However, if the sheets are contacted together in the same general direction of flow, and if a gentle angle of approach between the thin sheets is used, then the sheets will mix together and produce a new sheet of the mixture that is highly turbulent.

It is one object of the present invention to provide a means of contacting two or more liquids in a sheet thinner than has heretofore been possible, yet at flowrates suitable for industrial use. As the contacting of fluids occurs in thinner and thinner sizes, the mixing becomes more complete as well as rapid. The thinner the physical scale of mixing, the faster components can diffuse towards each other.

It is another object of the present invention to not only contact thin liquid sheets together, but further to mix them through turbulence within the newly-formed liquid sheet. This enhances mixing many fold by providing bulk movement of liquids towards one another rather than relying on molecular diffusion alone.

It is also an object of the present invention to provide a means of mixing liquid sheets together for fluids that are significantly viscous without unreasonable pressure drop.

A further object of the present invention is to provide devices for mixing thin liquid sheets together that are very simple and easily manufactured. The preferred embodiments of the present invention are simple to manufacture, easy to maintain, and require no alignment to maintain mixing of the ultra thin liquid sheets.

Readers will find further objects and advantages of the invention from a consideration of the ensuing description and the accompanying drawings.

DESCRIPTION OF A PREFERRED EMBODIMENT

Figure 1:
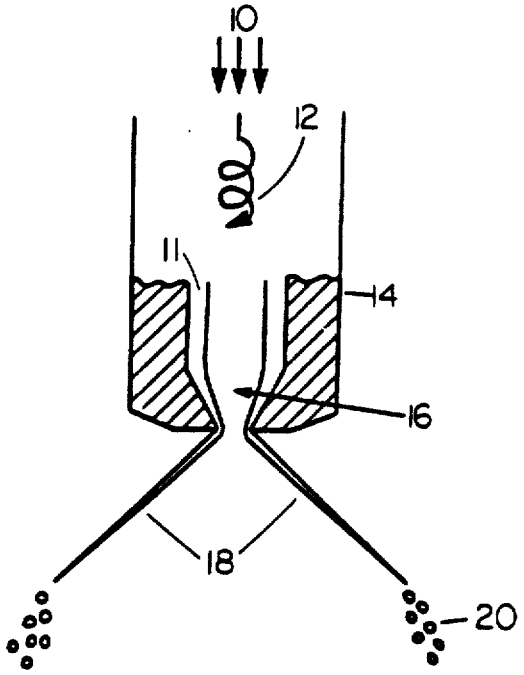
FIG. 1 illustrates the method by which a liquid atomizer forms a thin liquid sheet prior to droplet formation.

FIG. 1 illustrates a swirl atomizer that generates droplets by the disruption of a liquid sheet. Liquid 10 enters chamber 12 where it is swirled. The swirled liquid flows at high velocity (greater than 0.5 meter/-sec) as a thin film 11 with an air core 16 along the walls of the atomizer 14 until finally ejected into free space as a continuous thin liquid sheet 18. At some distance beyond the atomizer the sheet breaks up into droplets 20. Because the liquid velocity and liquid flowrate within the sheet are constant (therefore, the cross sectional area must remain constant), but the sheet expands radially or in its width, the liquid sheet must thin. This thinning continues to occur until surface tension forces exceed inertial, forces causing the liquid to roll back on itself to form droplets 20. These sheets are very thin (of order microns) and have a residence time on the order of milliseconds. The sheets are stable, provided that they are not prematurely disrupted into forming droplets. The droplets that form are typically 100 times or so thicker than the liquid sheet.

Figure 2:
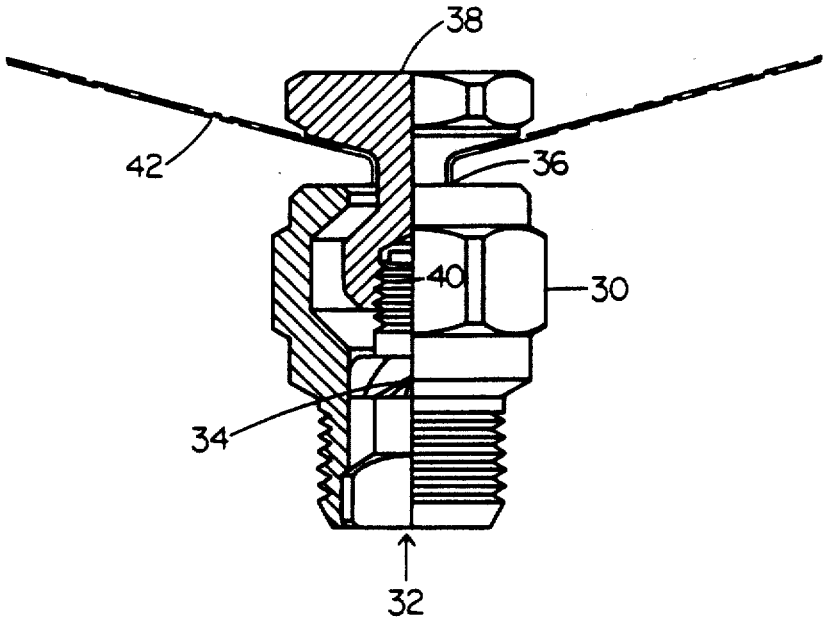
FIG. 2 is a sectional view of a preferred liquid atomizing device for use in the present invention.

A preferred atomizer for practicing the present invention is shown in FIG. 2. Referring to FIG. 2, atomizer 30 swirls fluid 32 in core 34. The swirled fluid flows along the walls of atomizer 30 as a fairly thin liquid layer of order hundreds of microns in thickness. The liquid sheet 42 exits through opening 36 at an angle of about 110 to 150 degrees. The center of atomizer 30 contains a deflector plate 38 that is screwed into the very center of the atomizer on thread 40. The liquid sheet 42 exiting the atomizer is deflected by deflector 38 to an angle of about 120 to 170 degrees, preferably 150 degrees relative to the atomizer.

Figure 3:
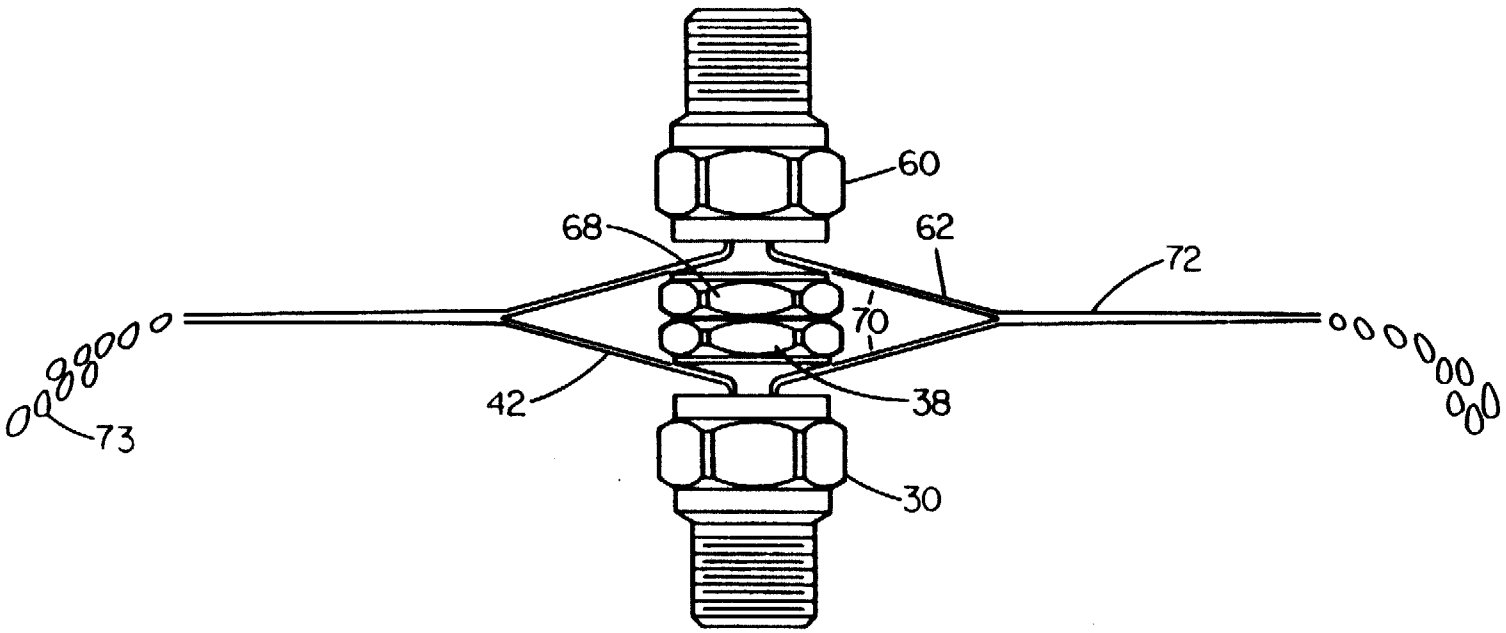
FIG. 3 illustrates a preferred embodiment of the present invention.

FIG. 3 illustrates how two of the atomizers considered in FIG. 2 can be used to practice the present invention. Atomizer 30 is now joined by an exact duplicate atomizer 60 that is inverted. Liquid sheets 42 and 62 are formed at angles of 150 degrees relative to atomizer 30 and atomizer 60 respectively. As the atomizers are brought physically closer to one another the liquid sheets 42 and 62 begin to contact and mix into a new sheet 72. As shown in FIG. 3, these single sheets are conical, resulting in a circular mixed sheet. The mixed sheet 72 is typically of equal length as either single thin liquid sheet 42 or 62. The preferred method of operation is to physically touch or join the deflector plates 38 and 68 together as is shown in FIG. 3. The liquid sheets 42 and 62 contact and form a new, continuous, highly-turbulent, mixed sheet 72. The mixed sheet 72 continues to thin until surface tension forces prevail, causing the formation of droplets 73. The contacting of the sheets is in the same general direction of liquid flow, and the contact angle 70 is usually about 30 degrees. If the liquid sheets were contacted at each other while flowing in opposite directions, annihilation of the thin liquid sheets would occur. Further, if the angle of contact is larger than about 60 degrees, the sheets of some liquids, particularly low viscosity liquids such as water, have a tendency to disrupt into droplets, rather than forming a mixed thin liquid sheet.

This preferred embodiment of the present invention has the advantage that physical joining of deflector plates 38 and 68 ensures proper alignment for mixed sheet formation at all times. Of course, this preferred means of mixing thin liquid sheets could be initially manufactured as one unit.

Single thin liquid sheets of water are generally transparent. However a thin mixed liquid sheet is substantially more opaque indicating turbulence within the mixed liquid sheet. It is the combination of contacting two or more liquids as thin sheets and producing a high degree of turbulence within the mixed sheet that provides for extremely rapid mixing times. For low viscosity fluids the mixing time is of order tenths of a millisecond, as demonstrated in Example 1, infra.

The degree of turbulence within the mixed thin liquid sheet is generally a function of the velocity of the single liquid sheets and the angle of contact or impingement. As the velocity and/or angle increases, so does the level of turbulence within the mixed sheet. In general, any angle of contact up to about 60° can be used for nonviscous fluids. For viscous fluids angles greater than about 30° are preferred in order to provide a high degree of turbulence. Further the maximum angle of contact allowable up to the point of sheet annihilation is higher for viscous fluids because the high viscosity tends to hold the liquid sheet together.

In general, however, contact angles greater than about 60° can lead to sheet disruption with premature droplet formation. This is not a preferred method of operation for two major reasons. The droplets that form are typically 100 times thicker than the thickness of the liquid sheet just prior to disruption. Further it is usually very difficult to generate turbulent flow within droplets. In contrast, the preferred embodiment not only contacts two thin liquid sheets, but it also produces a high degree of turbulence within the subsequently formed mixed liquid sheet.

Figure 4:
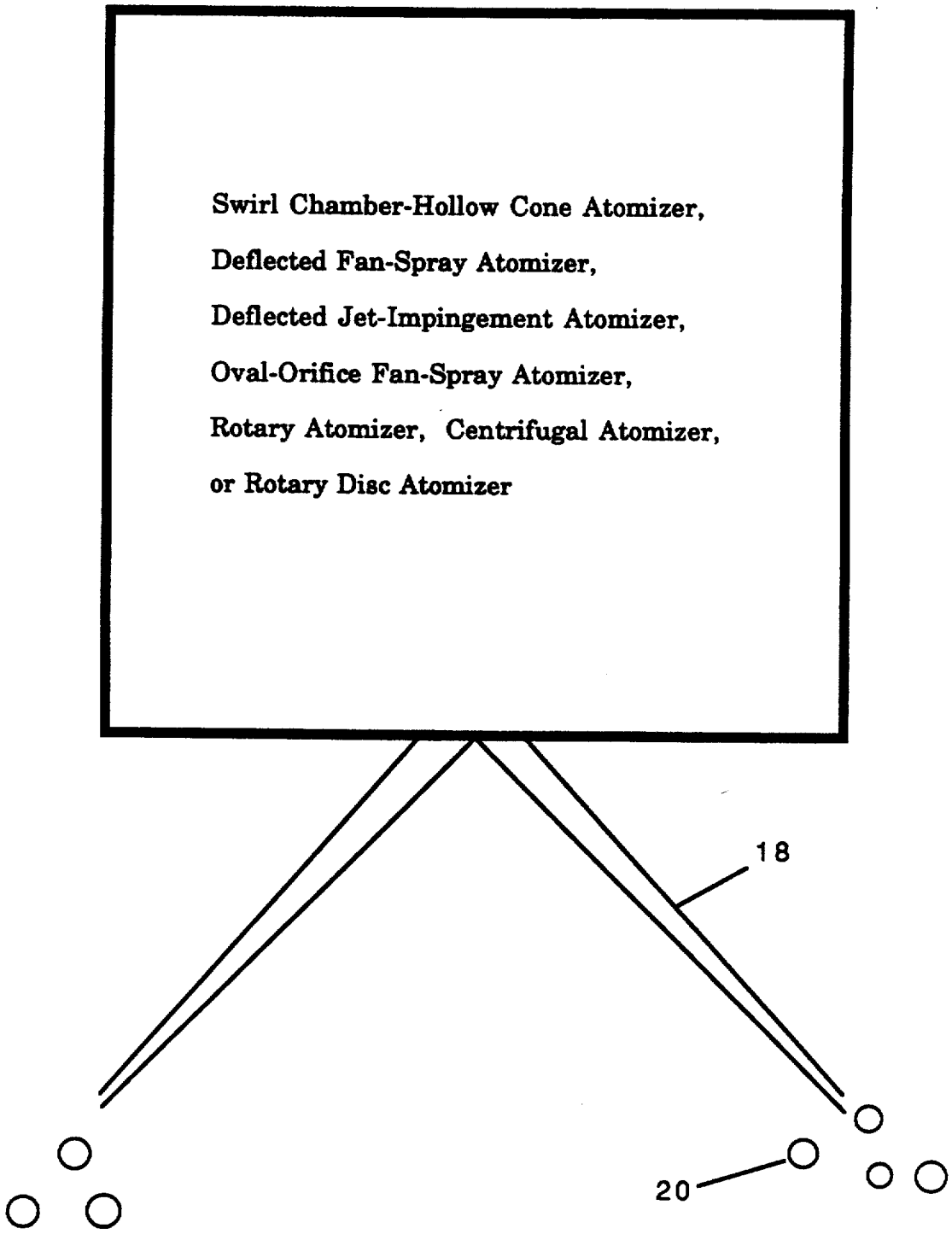
FIG. 4 illustrates other atomizing devices for use in the present invention.

While FIG. 3 illustrates a preferred means for practicing the present invention, any atomizing device that forms a thin liquid sheet, and can be devised to impinge upon another thin liquid sheet in the same flow direction at a gentle angle, can be used for practicing the process of the present invention. As shown in FIG. 4 such atomizing devices can be whirl (or swirl) chamber-hollow cone atomizers, deflected fanspray atomizers, oval-orifice fan-spray atomizers, jet-impingement deflected atomizers, centrifugal atomizers, rotary atomizers, rotary disc wheel or cup atomizers. These produce a sheet 18 and drops 20 similar to FIG. 1.

The preferred embodiment illustrated in FIG. 3 provides for physical contact between the atomizing devices. While this is highly desirable for maintaining proper alignment and thus reliability in mixed sheet formation, it is not required for the practice of the present invention. As an example, consider atomizers 30 and 60 of FIG. 3. If deflector plates 38 and 68 are removed, thin liquid sheets 42 and 62 will still impinge and form a mixed liquid sheet 72. This device, however, is less reliable because alignment of the liquid sheets is not as easily maintained and because the angle of contact or impingement approaches or exceeds 60 degrees since the sheet is not deflected to a 150° angle but retains about a 120° angle. These considerations are particularly important in high pressure applications where vibration can cause misalignment.

Although the discussion has primarily focused on the mixing of two liquids, tests have shown that three or more liquids may be mixed simultaneously to produce one single mixed liquid sheet by preferred embodiments of the present invention. However, the complexity of arranging and maintaining proper alignment may make such applications impractical. A better method, depending on the fluids to be mixed, is to use the present invention in series and mix only two liquids at a time. For example, if three liquids are to be mixed, liquids 1 and 2 can be mixed by the process of the present invention. The mixture of fluids 1 and 2 and the single liquid 3 can be mixed by another liquid sheet mixer in series with the first.

The present invention is applicable to any mixing process of liquids that can ordinarily be pumped through the liquid atomizing devices for the production of liquid sheets. For viscous liquids this means that the fluid velocity exiting the atomizer must be at least about 0.5 meter/sec; otherwise, no thin liquid sheet will form. Preferred liquid velocities for the practice of the present invention are about 2.0 meter/sec or greater. Particulate or solid matter in the fluid streams can be handled as long as they are smaller than the smallest opening in the atomizer so that plugging does not occur. In regards to this point atomizers with orifices as large as 12 cm and larger can be used to practice the present invention.

The flowrates of each liquid to be mixed can be varied over quite a wide range. Liquid flowrate ratios of 10:1 have been tested, and it is believed that much higher ratios can be used. The important parameter is pressure drop for equal flowrates through the atomizer. The pressure drop through each atomizer for equally viscous liquids should be approximately the same. If widely different flowrates are desired, one simply uses different atomizer orifice sizes. If liquids with widely different viscosities are to be mixed, then the Reynolds number and velocity of each liquid sheet are the important parameters.

The present invention is applicable to any liquid-liquid mixing process where the liquids in question can be formed into thin liquid sheets by the applicable atomizing devices. It is especially applicable to fast, multiple step reactions where selectivity is a problem due to incomplete or not rapid enough mixing. An example of such an applicable process is the coupling of 1-napthol with diazotised sulphanilic acid. The present invention is also very applicable to the reaction injection molding process where two somewhat viscous monomers or oligmers (100 to 1000 centipoise) are mixed together and react rapidly to form a high molecular weight, high viscosity polymer that will harden in a mold. Note that because the present invention forms thin liquid sheets and a thin mixed liquid sheet in free space, clogging of the atomizers and viscous product polymer buildup are not a problem.

The present invention is also very applicable to liquid-liquid extraction. Liquid-liquid extraction initially requires intimate contact between the light liquid phase and the heavy liquid phase. In many practical applications, however, the dispersion of one liquid in the other is very difficult because of high interfacial tension. This can lead to overall stage efficiencies of 0.1 or less leading to many more extraction stages than theoretically required. However, because the present invention contacts liquids together in thin liquid sheets and then further mixes them turbulently within a new mixed thin liquid sheet, dispersion of the liquids is very uniform. This should increase the overall stage efficiency for liquid-liquid extraction operations. Some other applications are fast enzyme biochemical reactions and formation of stable emulsions.

The present invention is also useful where the mixing of two liquids is accompanied by simultaneous absorption or desorption of a gaseous component. As is taught in my patent application Ser. No. 06/818,781 entitled "Liquid Sheet Carbonator", filed Jan. 13, 1986, liquid sheets can be used for the absorption or desorption of gases. The thinness of the liquid sheet, coupled with turbulence within the sheet, allows for rapid mass transfer and relatively high approach to equilibrium. Although a mixed sheet is typically twice as thick as a single sheet, the extremely high turbulence generated by the mixing process of the single sheets allows for high values of the approach to equilibrium. The approach to equilibrium for the mixed sheet is as high or higher than the single sheets. Example 3 (infra) compares the absorption of carbon dioxide in a mixed liquid sheet with a single liquid sheet.

In short, the present invention is especially preferred in applications where the mixing of liquids must be complete in short mixing times and/or intimate contact between liquids is desired. Further, absorption and/or desorption of gaseous components can occur simultaneously with the mixing of the liquid sheets.

While the above description contains many specificities, these should not be construed as limitations on the scope of the invention, but rather as an exemplification of a preferred embodiment thereof. Other variations are possible, and these are obvious to those skilled in the art based on the principles discussed in the description.

The following examples shall serve to illustrate the practice of the present invention. It should be understood that the data disclosed serve only as examples and are not intended to limit the scope of the invention.

EXAMPLE 1

Demonstration of the Speed and Completeness with Which Total Mixing Can Be Achieved by the Present Invention Two swirl atomizers of the type depicted in FIG. 2 producing conical liquid sheets at a 150 degree angle were situated so that their liquid sheets produced would contact at a point about 1.3 cm from the exiting point of each atomizer (as in FIG. 3). The liquid sheets separately or mixed extended to a distance of about 5 to 6 cm from the atomizer, thus indicating no loss in sheet length as a result of mixed sheet formation. The angle of contact between the two single liquid sheets was 30 degrees. At a distance of 1.3 cm. the single sheet thickness is about 25 microns. The velocity in each liquid sheet was about 12 meter/sec, calculated as 60% of the theoretical velocity head. Sixty percent is typical of swirl atomizers of the type shown in FIGS. 2 and 3. Since the point at which the liquid sheets contact forms a mixed sheet of 180 degrees relative to the atomizers (as in FIG. 3), there is a component of velocity in the direction of sheet thickness. This is true because each single sheet before contact flowed at an angle of 150 degrees relative to the atomizers. The component of velocity in the direction of sheet thickness is 12 meter/-sec multiplied by the sine of one-half the contact angle or in this case 15 degrees. Therefore, the velocity in the direction of thickness of the mixed sheet is about 3.1 meter/sec. Since the thickness that the components must diffuse is only 25 microns, the physical mixing time is about 8 microseconds.

In order to test the validity of this calculation an experiment was devised to estimate the time of mixing. A solution of 1.0 gmole/liter (N) NaOH containing phenolpthalein indicator was pumped through one atomizer while a solution of 1N $H_2SO_4$ was pumped through the other swirl atomizer. It is well known that strong acid-strong base neutralizations are virtually instantaneous. The phenolpthalein was used as an indicator of neutralization between the acid and base. In basic solution phenolpthalein is red, whereas it is clear in acidic solutions. However it was not possible to see the red color of the phenolpthalein regardless of its concentration because of the extreme thinness (30 microns or less) of the liquid sheets formed. To test for neutralization a 0.5 mm probe was immersed directly into the mixed liquid sheet. This resulted in local premature sheet disruption along the radial line of immersion, causing liquid to bend up along the probe. These beads are about 100 times or so thicker than the thin sheet and color can be readily seen in them.

For a flowrate of 1450 milliliters/min of 1.0N NaOH containing phenolpthalein and at a contact thickness of each sheet of about 25 microns, the following flowrates of $H_2SO_4$ yielded the following color of the mixed sheet:

| 1.0 N $H_2SO_4$ flowrate | Color of mixed sheet |
|---|---|
| 980 ml/min | red |
| 1180 ml/min | red |
| 1410 ml/min | light red |
| 1520 ml/min | clear |
| 1620 ml/min | clear |

At equal flowrates (1450 ml/min) the acid and base should neutralize each other, and the phenolpthalein indicator should turn clear. Allowing for the uncertainty in the flowmeter resolution, it is seen that the mixed sheet was clear when an excess of 5% acid was used. This value of 5% is within the accuracy of the flowmeters used. No color was noted anywhere within the sheet at the neutralization flowrate. When the probe was immersed just beyond the well-defined mixing zone where the liquid sheets contacted, the color at the neutralization flowrate was still clear just as it was over 5 cm further away in the mixed liquid sheet.

The time of travel 0.5 mm beyond the mixing zone for sheets with a velocity of about 12 meter/sec is approximately $4\times10^{-5}$ second. Therefore the time required for mixing yielding neutralization has a probable upper value of 40 microseconds for the low viscosity fluids tested. The reader will note that this mixing time is less than the mixing time for Kletenick's device discussed earlier. This is expected since the present invention contacts two liquid sheets which are thinner than the sheets produced by Kletenick's device. The mixing time of the present invention is less than the mixing time claimed by Kletenick for his device, and further, much higher liquid flowrates can be used in the present invention.

EXAMPLE 2

Two swirl atomizers of the type shown in FIG. 2 producing conical sheets at an angle greater than 150 degrees were positioned so that their liquid sheets would contact and mix. Through both atomizers soybean oil (viscosity of about 50 centipoise) was pumped at a pressure drop of 50 psi. Each sheet along was clearly in laminar flow as evidenced by the glassy appearance of the liquid sheets. When the sheets impinged, the mixed sheet length actually increased by 25% from about 20 cm to about 30 cm compared to the length of the single sheets.

Although the degree of turbulence in the mixed sheet was low due to the low atomizer pressure drop and high liquid viscosity, the mixed sheet was wavy and contained ripples of fluid. This waviness and rippling is often used as a criterion for the onset of turbulent flow. The waviness and rippling clearly indicate mixing in the direction of thickness of the mixed sheet. Higher pressure drops than that used in this example, would only serve to increase the turbulence of the mixed sheet and would not effect the contacting or impingement process. Viscous fluids tend to produce longer and more stable sheets that are more resistant to disruption than low viscosity fluids.

EXAMPLE 3

Absorption of a Gas in a Mixed Liquid Sheet

Two swirl atomizers of the type shown in FIG. 2 producing conical sheets at an angle of about 150 degrees were positioned so that their liquid sheets would contact and mix as shown in FIG. 3. Through both atomizers water initially free of carbon dioxide was pumped at a pressure drop of 20 psi into a pressure vessel substantially containing carbon dioxide. The flowrate of water in the mixed liquid sheet was about 11.0 liters/min. Water exiting the pressure vessel was found to contain carbon dioxide in an amount equal to 58% of the equilibrium or in this case maximum amount possible. Carbon dioxide concentration in the water was determined by titration with standard solutions.

When the two atomizers were positioned far apart from one another so that a mixed liquid sheet could not form, the approach to equilibrium of a single liquid sheet was 54%. Even though the total flowrate for the mixed liquid sheet was twice as high as the single sheet, the increased turbulence within the mixed liquid sheet allowed for a higher approach to equilibrium. The mixed liquid sheet although twice as thick as the single sheet, had a degree of turbulence that was much higher than the turbulence in the single sheet. Thus the reader will see that the liquid sheet mixer provides extremely rapid and uniform mixing of liquids. While the above description contains many specificies, these should not be construed as limitations on the scope of the invention, but rather as an exemplification of one preferred embodiment thereof. Many variations on the preferred embodiment are possible. For example, as mentioned earlier, the angle of contact can vary from just greater than 0 degrees to almost 90 degrees. Accordingly, the scope of the invention should be determined not by the embodiment illustrated, but by the appended claims and their legal equivalents.

I claim:

1. A method of rapidly forming an intimate mixture of a plurality of liquids, comprising the following steps:

(a) causing each of said plurality of liquids to form *in a free-space environment* a continuous sheet of liquid which expands in width and decreases in thickness, (b) causing the resulting plurality of sheets of liquid to contact each other *in said free-space environment* at an acute angle and thereupon combine to form a resultant mixed sheet of said liquids, whereby said plurality of liquids will admix with uniformity, rapidity, and intimacy.

2. A method as in claim 1 wherein each of said resulting plurality of sheets of liquid is conical in shape.

3. A method as in claim 1 wherein each of said resulting plurality of sheets of liquid is in the shape of a partial conical section.

4. A method as in claim 1 wherein each of said resulting plurality of sheets of liquid is fan shaped.

5. A method as in claim 1 wherein each of said resulting plurality of sheets of liquid is formed by a liquid atomizing device.

6. A method as in claim 5 wherein said step of forming with a liquid atomizing device comprises the use of a swirl chamber-hollow cone liquid atomizer.

7. A method as in claim 5 wherein said step of forming with a liquid atomizing device comprises the use of a deflected fan-spray atomizer.

8. A method as in claim 5 wherein said step of forming with a liquid atomizing device comprises the use of a deflected jet-impingement atomizer.

9. A method as in claim 5 wherein said step of forming with a liquid atomizing device comprises the use of an oval-orifice fan-spray atomizer.

10. A method as in claim 5 wherein said step of forming with a liquid atomizing device comprises the use of a rotary atomizer.

11. A method as in claim 5 wherein said step of forming with a liquid atomizing device comprises the use of a centrifugal atomizer.

12. A method as in claim 5 wherein said step of forming with a liquid atomizing device comprises the use of a rotary disc atomizer.

13. A method as in claim 5 wherein the atomizing devices forming said resulting plurality of sheets of liquid are physically connected, thereby allowing for proper alignment in the production of said resultant mixed sheet of said liquids.

14. A method as in claim 1 wherein each of said resulting plurality of sheets of liquid is caused to flow laminarly and contact each other sheet so as to produce a mixed sheet of liquid in turbulent flow.

15. A method as in claim 1 wherein each of said resulting plurality of sheets of liquid is caused to flow in a turbulent manner and contact each other sheet so as to produce said mixed sheet of said liquids with a higher degree of turbulence than said resulting plurality of sheets.

16. A method as in claim 1 wherein concurrent to forming said resultant mixed sheet of said liquids, said resultant mixed sheet of said liquids absorbs a gaseous component.

17. A method as in claim 1 wherein concurrent to forming said resultant mixed sheet of said liquids, said resultant mixed sheet of said liquids desorbs a gaseous component.

18. A method of admixing a plurality of liquids with rapidity, intimacy, and uniformity, comprising:

(a) forcing each of said liquids through an atomizer such that each of said liquids will exit its atomizer *into a free-space environment* in the form of a continuous, thinning, conical sheet, (b) positioning each of said atomizers so that they are coaxial and so that each faces the other atomizer and selecting the pressure, conical angle, and spacing of said atomizers such that said two conical sheets will face each other and meet *in said free-space environment* at an acute angle and combine to form a resultant mixed sheet of said liquids which has a circular shape and is oriented perpendicularly to the axes of said atomizers.

19. A method as in claim 18 wherein said atomizers forming said sheets of liquid are physically connected, thereby allowing for proper alignment in production of said resultant mixed sheet of said liquids.

* * * * *